UNITED STATES PATENT OFFICE.

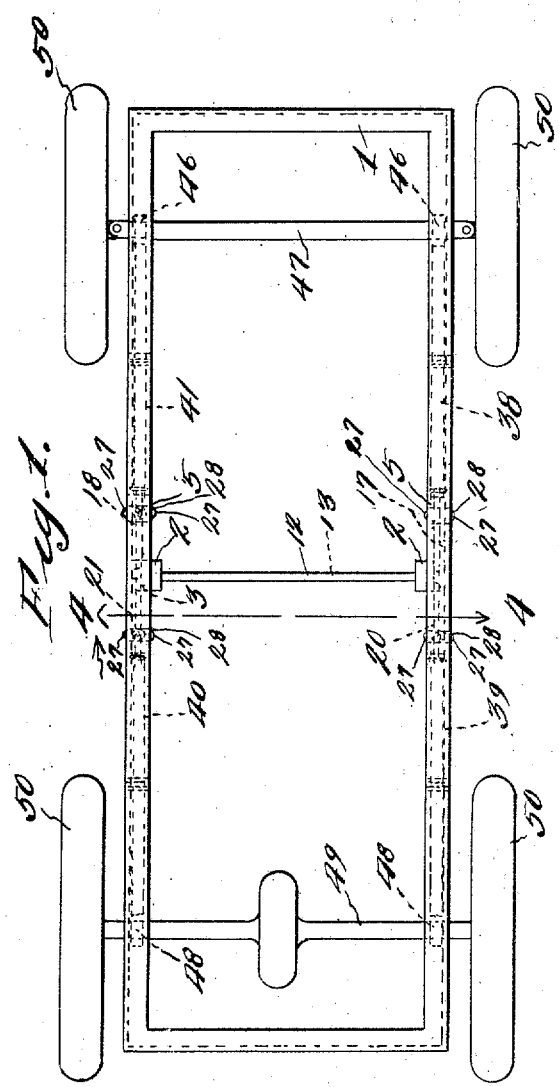
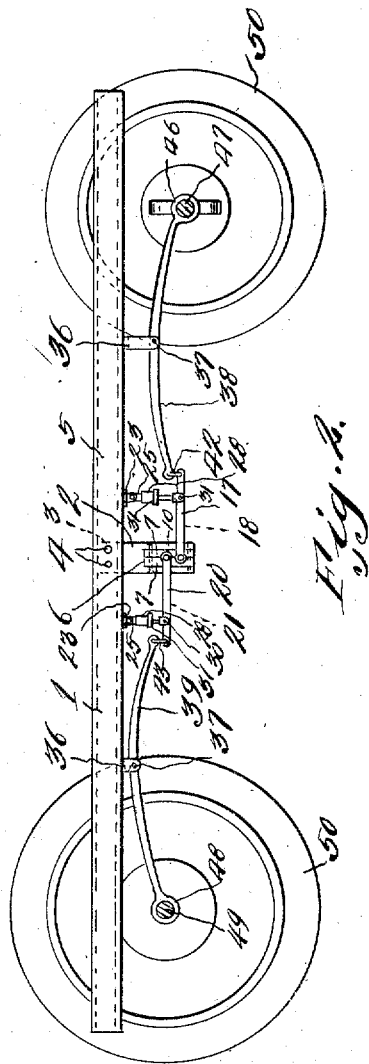

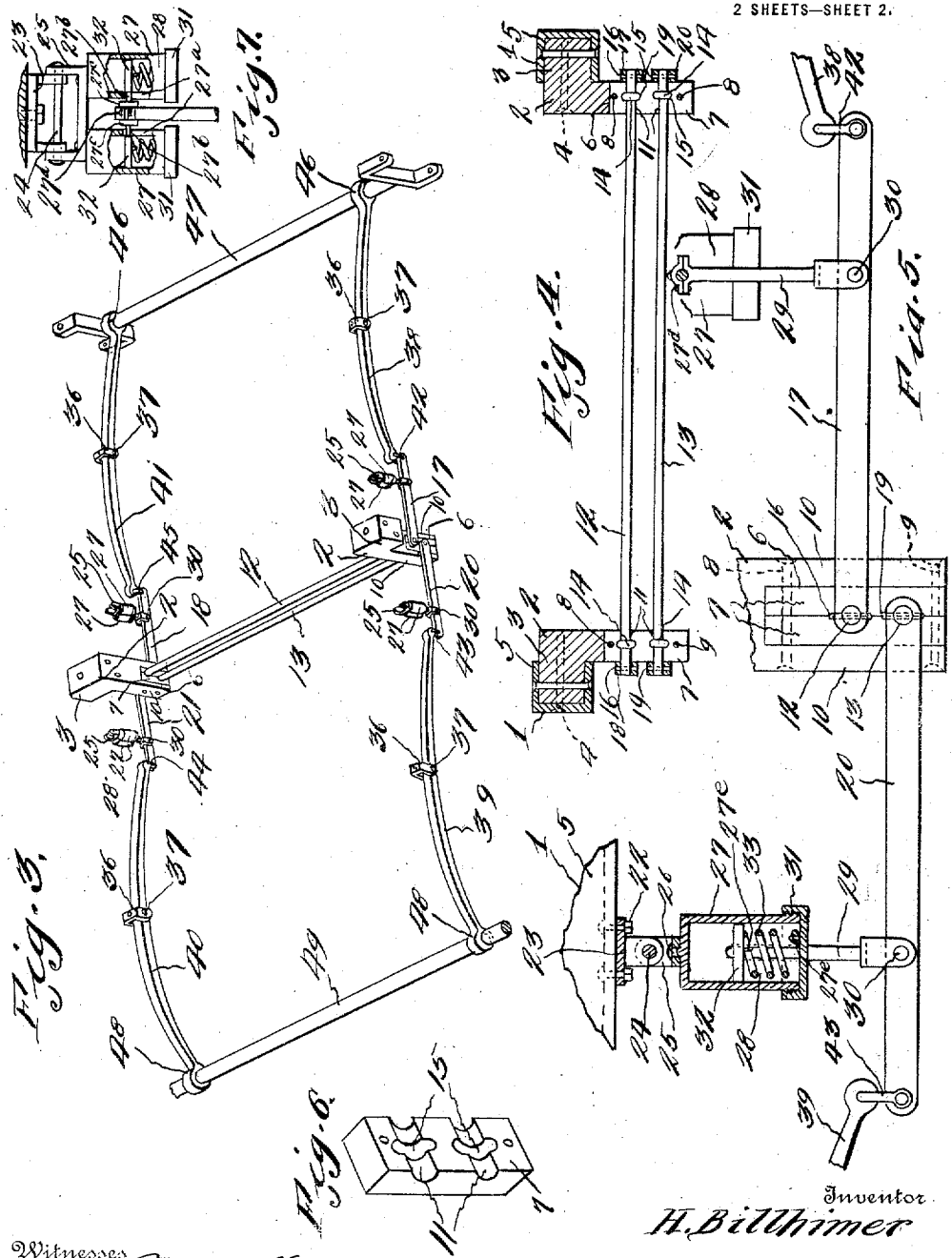

HERSCHEL BILLHIMER, OF NEW MADISON, OHIO.

SHOCK-ABSORBER.

1,208,276.      Specification of Letters Patent.     Patented Dec. 12, 1916.

Application filed March 29, 1916. Serial No. 87,513.

*To all whom it may concern:*

Be it known that I, HERSCHEL BILLHIMER, a citizen of the United States, residing at New Madison, in the county of Darke, State of Ohio, have invented a new and useful Shock-Absorber; and I do hereby declare the following to be a full, clear, and exact description of the invention, such as will enable others skilled in the art to which it appertains to make and use the same.

This invention relates to the art of shock absorbers, and more particularly to an improved shock absorber for vehicle bodies, more especially those of automobiles.

One of the objects of the invention is to provide a shock absorber, whereby the shock received incident to one of the front wheels passing over a rough road bed, will be transferred diagonally across the running gear, and practically absorbed before or by the time it reaches one of the diagonally disposed rear wheels and vice versa.

Another object of the invention is to provide a device of this kind, which is simple, efficient and practical, and involves improved features of construction.

In practical fields the details of construction may necessitate alterations, falling within the scope of what is claimed.

The invention comprises further features and combinations of parts, as hereinafter set forth, shown in the drawings and claimed.

In the drawings: Figure 1 is a plan view of a conventional form of automobile frame, showing the shock absorbing running gear as applied thereto in dotted lines. Fig. 2 is a view in side elevation, showing the wheels of one side removed and the axles in section. Fig. 3 is a detail perspective view of the shock absorbing running gear. Fig. 4 is a sectional view on line 4—4 of Fig. 1. Fig. 5 is a view partly in section and partly in elevation of a portion of the shock absorbing running gear. Fig. 6 is a detail perspective view of one of the bearing blocks for the transversely disposed rocking shaft of the shock absorbing running gear. Fig. 7 is a detail view in elevation and in section, of the connections between the part 29 and the frame 1, taken at right angles to that shown in Fig. 5, which shows the same connections.

Referring more especially to the drawings, 1 designates the frame for supporting the body of the vehicle or the automobile. Carried by the frame 1 substantially centrally between the ends of the frame are oppositely disposed members 2, the outwardly and laterally extending parts 3 of which are bolted or otherwise secured at 4 in the channels of the longitudinal bars 5 of said frame 1. The lower parts of said members are provided with U-shaped recesses 6, in which the adjacent bearing blocks 7 are arranged, there being pins 8 and 9 extending through the forks 10 of the members 2, and through the bearing blocks 7, so as to secure the blocks 7 securely in place. The adjacent faces of said blocks 7 are provided with transverse semi-cylindrical recesses 11, which, as will be noted when the adjacent faces are together, as shown clearly in Figs. 2 and 5, form cylindrical bearings for the rocking shafts 12 and 13. Near the ends of the shafts 12 and 13 are integral collars 14, which are semi-circular in cross section, and designed to engage the auxiliary semi-circular recesses 15, which are transverse of the recesses 11 upon the adjacent faces of the blocks 7, thereby preventing axial or endwise movement of the shafts 12 and 13.

Secured by the pins 16 to the ends of the shaft 12 are the levers 17 and 18, and secured by the pins 19 to the ends of the shaft 13 are the levers 20 and 21.

Secured by the bolts 22 to the frame 1 are the bracket plates 23, to the ears of which, by means of the pins 24 the U-shaped plates 25 are pivoted, which U-shaped plates 25 are secured at 26 to the casings 27 of the auxiliary shock absorbers 28, the piston rods 29 of which are pivoted respectively to the levers 17, 18, 20 and 21, as shown at 30.

Each auxiliary shock absorber consists of two casings having threaded closures 31, and mounted in the casings 27 are pistons 32 (which are carried by the piston rods 29), there being coil springs 33 below the pistons. The casings 27 of each auxiliary shock absorber are arranged adjacent each other, but with an interval of space between them, into which space the piston 29 of each shock absorber is arranged. The adjacent walls of the casings 27 of each shock absorber are provided with registering slots 27$^a$, and the pistons 32 of each shock absorber 28 are integrally connected by the connecting rod 27$^b$ having integral collars 27$^c$, between which collars the upper end of the piston rod 29 is connected by means of the cap plate 27$^d$. It is to be seen that the connecting rod between the two pistons 32 is guided in the registering slots 27ª. The springs 33 have their opposite ends connected to the pistons 32 and to the closures 31, so that the spring will absorb the shock, whether moving upwardly or downwardly. Owing to the provision of the slots 27ª, the pistons 32 can freely act in coöperation with the springs.

Carried by the frame 1 are the brackets 36 (which are U-shaped) and pivoted to rock in these brackets by means of the pivots 37 are the levers 38, 39, 40 and 41. The inner end of the lever 38 is linked at 42 to the lever 17, while the inner end of the lever 39 is linked at 43 to the lever 20. The inner end of the lever 40 is linked at 44 to the lever 21, and the inner end of the lever 41 is linked at 45 to the lever 18. The forward ends of the levers 38 and 41 are connected at 46 to the forward axle 47 of the running gear, and the rear ends of the levers 39 and 40 are connected at 48 to the rear axle 49, which forward and rear axles are provided with the usual wheels 50, as shown in Figs. 1 and 2.

It is to be noted that when the forward right hand wheel strikes a raised portion in the road bed, the lever 34 is rocked upon its pivot, which pulls down upon the lever 17 against the action of one of the springs 33 in the auxiliary shock absorber, thereby rocking the shaft 12, and owing to the lever 21 at the other end of the shaft 12 being connected to a diagonal opposite auxiliary shock absorber piston rod, upward pressure is exerted on the springs of said diagonal opposite shock absorber, at the same time rocking the lever 40. The levers 38, 39, 40 and 41 are bowed upward, and are yieldable, and it will be noted that the shock that may be received by either one of the forward wheels or by either one of the rear wheels, in being transferred diagonally across the running gear, is absorbed by the time it reaches the diagonal disposed supporting wheel, thereby relieving the jar or jolt to the body of the vehicle.

The invention having been set forth, what is claimed as new and useful is:

1. A shock absorbing running gear for vehicles comprising members secured to opposite sides of the frame having U-shaped recesses, bearing blocks secured therein, upper and lower rock shafts mounted in said bearing blocks, the opposite ends of each shaft having oppositely extending levers, oscillatory spring levers connected to the ends of the first levers and carried by the frame of the vehicle and being in turn connected to the forward and rear axles.

2. A shock absorbing running gear for vehicles comprising members secured to opposite sides of the frame having U-shaped recesses, bearing blocks secured therein, upper and lower rock shafts mounted in said bearing blocks, the opposite ends of each shaft having oppositely extending levers, oscillatory spring levers connected to the ends of the first levers and carried by the frame of the vehicle and being in turn connected to the forward and rear axles, and auxiliary spring tensioned shock absorbers connecting the first levers to the frame of the vehicle.

3. In improvements in a shock absorbing running gear for vehicles, a pair of members secured to opposite sides of the frame of the vehicle substantially midway of the ends of the frame, bearing blocks mounted in said members, upper and lower transverse shafts mounted in the bearing blocks, the opposite ends of each shaft having oppositely extending levers movable therewith, two pairs of spring levers, the levers of one pair being in parallelism and being pivoted substantially midway their ends to the frame of the vehicle and having their forward ends connected to the forward axle of the vehicle, the rear end of one of the forward spring levers being linked to one of the first levers carried by the upper transverse shaft, the rear end of the other forward spring lever being linked to one of the first levers of the lower shaft, the spring levers of the other pair being in parallelism and having their rear ends connected to the rear axle of the vehicle and being pivoted midway their ends to the frame of the vehicle, the forward end of the last mentioned pair of spring levers being linked to the respective levers which extend respectively, one end of each of said shafts rearwardly.

4. In improvements in a shock absorbing running gear for vehicles, a pair of members secured to opposite sides of the frame of the vehicle substantially midway of the ends of the frame, bearing blocks mounted in said members, upper and lower transverse shafts mounted in the bearing blocks, the opposite ends of each shaft having oppositely extending levers movable therewith, two pair of spring levers, the levers of one pair being in parallelism and being pivoted substantially midway their ends to the frame of the vehicle and having their forward ends connected to the forward axle of the vehicle, the rear end of one of the forward spring levers being linked to one of the first levers carried by the upper transverse shaft, the rear end of the other forward spring lever being linked to one of the first levers of the lower shaft, the spring levers of the other pair being in parallelism and having their rear ends connected to the rear axle of the vehicle and being pivoted midway their ends to the frame of the vehicle, the forward end of the last mentioned pair of spring levers being linked to the respective levers which extend respectively, one end of each of said shafts rearwardly, and auxiliary spring tensioned shock absorbers connecting the first levers to the frame of the vehicle, said bearing blocks having means to prevent axial movement of the upper and lower shaft.

In testimony whereof I have signed my name to this specification in the presence of two subscribing witnesses.

HERSCHEL BILLHIMER.

Witnesses:
 ORVILLE BILLHIMER
 J. F. S. HAGEMAN.